H. L. VAUGHAN.
BOTTLE CARRIER.
APPLICATION FILED OCT. 14, 1918.
1,307,067.
Patented June 17, 1919.
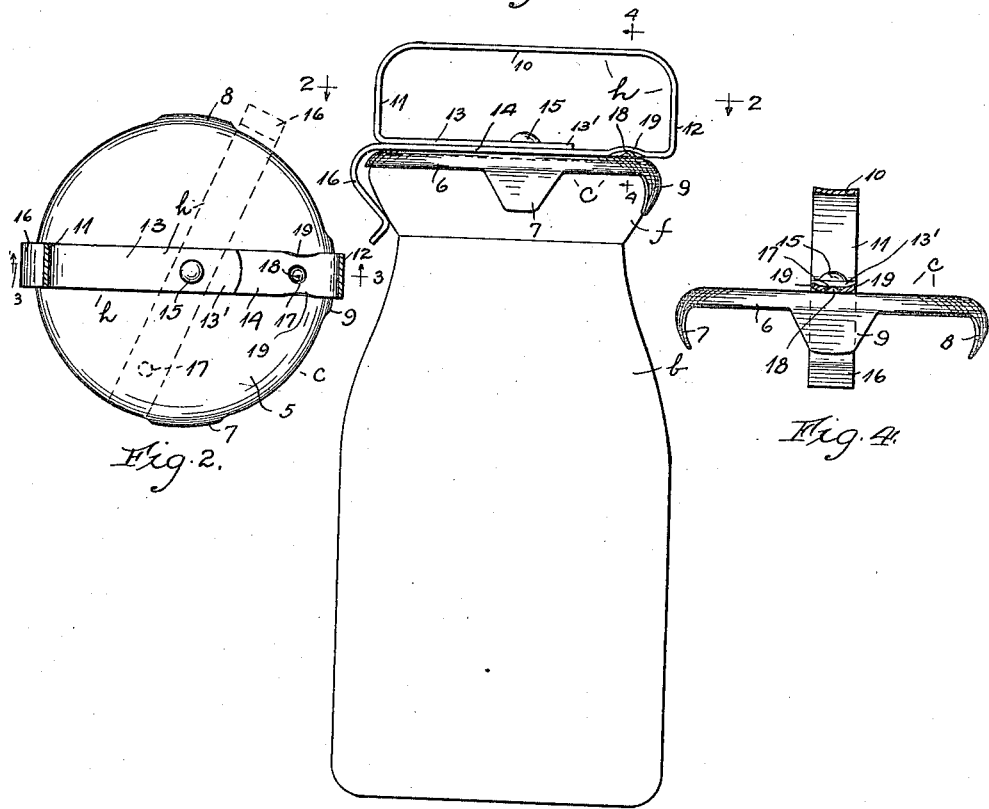
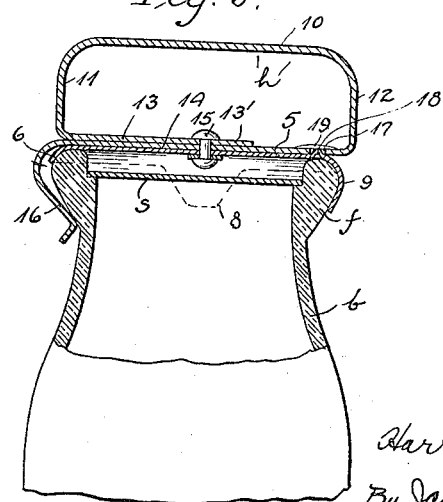
Inventor,
Harry L. Vaughan
By James R. Offield
Atty.

UNITED STATES PATENT OFFICE.

HARRY L. VAUGHAN, OF CHICAGO, ILLINOIS.

BOTTLE-CARRIER.

1,307,067.   Specification of Letters Patent.   Patented June 17, 1919.

Application filed October 14, 1918. Serial No. 257,941.

*To all whom it may concern:*

Be it known that I, HARRY L. VAUGHAN, a citizen of the United States, and a resident of Chicago, in the county of Cook and State of Illinois, have invented certain new and useful Improvements in Bottle-Carriers, of which the following is a specification.

My invention relates to an improved device by means of which bottles can be readily carried and which at the same time acts as a protective closure for the bottle.

My invention is particularly useful in connection with milk bottles which cannot be conveniently carried, particularly by children. The object of my invention is therefore to provide a simple device which can be quickly and readily clamped to the flange surrounding the bottle mouth and which will then serve as a handle by means of which the bottle can readily be carried, the device being therefore a very desirable and useful household article.

The device comprises a frame in the form of a cover provided with a number of clamping tongues, and a handle structure having at one end a clamping tongue and adapted when turned in one position to permit the device to be applied to the bottle, and when shifted to another position to cause the bottle flange to be securely clamped by the tongues. Another feature resides in means for locking the handle in clamping position to prevent accidental release of the device. Another feature resides in the simplicity and inexpensiveness of the device, it being stamped and formed entirely of sheet metal.

The device of my invention is clearly illustrated on the accompanying drawing in which—

Figure 1 is a side elevational view of a milk bottle showing the device applied thereto, Fig. 2 is a sectional view on plane 2—2, Fig. 1, Fig. 3 is a sectional view on plane 3—3, Fig. 2, and Fig. 4 is a side elevational view of the device with the handle part in section on plane 4—4, Fig. 1.

The device comprises the cover part $c$ and the handle part $h$. The cover part is stamped integral from sheet metal and comprises the circular top part 5 with its edge turned down to form the flange 6 and the tongues 7, 8 and 9 forming continuations of the flange, the flange and tongues being curved to fit the flange $f$ surrounding the mouth of bottles, such as the milk bottle $b$.

The handle part $h$ is bent up and formed from a length of sheet metal bar and is of rectangular shape. It comprises the top section 10, the side sections 11 and 12, and the bottom sections 13 and 14. These bottom sections are the ends of the bar and overlap a distance, a rivet 15 extending therethrough and through the top 5 of the cover part to pivot the handle on the cover. The end of the bottom section 14 of the handle is deflected downwardly and shaped to form a clamping tongue 16 for coöperating with the tongues 7, 8 and 9 to lock the device to the bottle flange $f$. The handle is eccentrically pivoted to the cover, the rivet 15 extending through the cover top a short distance to one side of the center thereof and between the center and the cover tongue 9.

When the device is to be applied the handle is swung to carry its tongue away from the space between the cover tongues 7 and 8 so that the cover can be readily slipped over the bottle mouth to bring its tongues into engagement with the flange $f$. The tongues 7 and 8 are set a distance away from the diametral line of the cover and toward the tongue 9, and this permits the cover to be more readily slid into place. After such sliding on of the cover the handle is turned to bring its tongue 16 into engagement with the bottle flange at a point opposite the cover tongue 9, and owing to the eccentric pivot connection between the handle and cover the tongue 16 will, during turning of the handle, be pressed against the bottle flange and this resilient spring engagement of the tongue 16 will cause the cover tongues to be drawn securely against the bottle flange, and then by inserting the fingers between the top and sides of the handle the bottle can readily be carried.

In order to prevent accidental release of the device from the bottle I provide means for releasably locking the handle to the cover after it has been shifted into clamping position. As shown, the bottom section 14 of the handle has the pocket or hole 17 therein for receiving the bead or point 18 deflected upwardly from the cover top. To permit the handle to be readily rotated to receive the bead 18 the edge sections 19 adjacent the hole are up-turned slightly, as best shown in Fig. 4. To release the device from the bottle a slight downward pressure on the cover near the bead 18 will release the bead from the hole 17 and permit the handle to be rotated so that the cover can be slid off the bottle. The end 13' of the handle section 13 extends a distance beyond the rivet 15 so that its spring action will assist the adjacent end of the section 14 to hold the hole and bead in interlocking position.

The handle and cover parts are preferably constructed of steel or other material which is of sufficient stiffness to maintain the shape of the tongues and prevent bending thereof during ordinary use of the device but which will permit the tongues to be bent under extraordinary pressure so that they can be adjusted in view of slight differences in bottle sizes and irregularities.

My improved device is of simple and inexpensive construction and forms a very useful and desirable household article. Not only does it serve as a carrier for bottles but it also acts as a cover to protect the bottle's contents and particularly to protect the seal s on milk bottles, which seals are usually of paper and easily displaced by pressure thereon.

I do not, of course, desire to be limited to the exact construction and arrangement shown and described as changes and modifications are no doubt possible which would still come within the scope of the invention.

I claim as follows:

1. In a bottle carrier device, the combination of a frame for fitting over the mouth of a bottle and having tongues for engaging with the bottle sides, and a handle pivoted on said frame and having a tongue adapted to be moved circumferentially relative to the mouth of the bottle for coöperating with said frame tongues to hold the frame to the bottle.

2. A bottle carrier comprising a cover part having tongues for engaging with the bottle head, a handle pivoted on said cover part and having a tongue adapted to be moved circumferentially relative to the mouth of the bottle, said handle when swung to one position permitting the cover part to be slipped over the bottle mouth and when swung to another position causing its tongue to engage with the bottle to lock the cover tongues thereto.

3. A bottle carrying device comprising a cover part for engaging over the mouth of a bottle and having clamping tongues for engaging around the flange at the bottle mouth, a handle part eccentrically pivoted on said cover part and having a tongue adapted to be moved circumferentially relative to the mouth of the bottle for engaging with the bottle flange to lock the cover part tongues thereto.

4. A carrier for milk bottles comprising a cover part for engaging over the mouth of the bottle, tongues extending from said cover part for engaging transversely around the flange at the bottle mouth, a handle part pivoted eccentrically on said cover part and having a tongue extending therefrom for engaging with the bottle flange, rotation of said handle circumferentially relative to the mouth of the bottle to one position permitting the cover part to be slipped over the bottle neck and rotation of the handle to another position bringing its tongue into pressure engagement with the bottle flange whereby said cover part tongues are also pressed against the bottle flange.

5. A carrier for milk bottles comprising a cover part for engaging over the mouth of the bottle, clamping tongues on said cover part for engaging transversely around the flange at the bottle mouth, a handle part eccentrically pivoted on said cover part and having a tongue for engaging with the bottle flange to coöperate with the cover part tongues to lock the carrier to the bottle, and means for yieldingly locking said handle to the cover part.

6. A carrier for milk bottles comprising a cover part for engaging over the mouth of a bottle, tongues on said cover part for engaging around the flange at the bottle mouth, a handle part having a tongue for engaging with the bottle flange, said handle being eccentrically pivoted on said cover part whereby when it is turned its tongue will be brought into increasing pressure engagement with the bottle flange, and means for yieldingly locking the handle and cover parts together.

7. A bottle carrier device comprising a cover part stamped integral from sheet metal and having clamping tongues for engaging around the lip of the bottle, a handle part formed integral from a band of metal and having its one end formed into a tongue for also engaging with the bottle lip, said handle being eccentrically pivoted on said cover part whereby when it is rotated circumferentially relative to the mouth of the bottle its tongue will be gradually brought into pressure engagement with the bottle and said tongue and the cover part tongues firmly clamped to the bottle.

8. A bottle carrier device comprising a cover part stamped integral from sheet metal and having clamping tongues for engaging around the lip of the bottle, a handle part formed integral from a band of metal and having its one end formed into a tongue for also engaging with the bottle lip, said handle being eccentrically pivoted on said cover part whereby when it is rotated its tongue will be gradually brought into pressure engagement with the bottle and said tongue and the cover part tongues firmly clamped to the bottle, and means for yieldingly clamping said cover and handle parts together.

In witness whereof, I hereunto set my hand this 10th day of October, A. D., 1918.

HARRY L. VAUGHAN.